(12) United States Patent
Popovski et al.

(10) Patent No.: US 11,088,416 B2
(45) Date of Patent: Aug. 10, 2021

(54) BATTERY PACK TO VEHICLE ATTACHMENT ASSEMBLY AND ATTACHMENT METHOD

(71) Applicant: Ford Global Technologies, LLC, Dearborn, MI (US)

(72) Inventors: Mike Popovski, Warren, MI (US); Ihab Grace, Grosse Pointe Woods, MI (US); Abigail Christensen, Canton, MI (US); Chelliah Madasamy, Canton, MI (US); Abdelmonaam Sassi, Windsor (CA); Sean Brady, Royal Oak, MI (US); John Jardine, Harrison Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 16/590,558

(22) Filed: Oct. 2, 2019

(65) Prior Publication Data

US 2021/0104715 A1   Apr. 8, 2021

(51) Int. Cl.
| | | |
|---|---|---|
| *B60K 1/04* | (2019.01) | |
| *B60R 16/04* | (2006.01) | |
| *H01M 50/20* | (2021.01) | |
| *B60L 50/64* | (2019.01) | |

(52) U.S. Cl.
CPC .............. *H01M 50/20* (2021.01); *B60K 1/04* (2013.01); *B60L 50/64* (2019.02); *B60R 16/04* (2013.01); *B60K 2001/0438* (2013.01)

(58) Field of Classification Search
CPC .......... H01M 50/20; B60L 50/64; B60K 1/04; B60R 16/04
See application file for complete search history.

(56) References Cited

U.S. PATENT DOCUMENTS

| | | | |
|---|---|---|---|
| 7,540,343 B2 | 6/2009 | Nakashima et al. | |
| 8,833,839 B2 * | 9/2014 | Young ................. | B62D 21/157 296/187.12 |
| 8,863,877 B2 * | 10/2014 | Saeki ...................... | B60K 1/04 180/68.5 |
| 9,027,684 B2 * | 5/2015 | Araki ...................... | B60K 1/04 180/68.5 |
| 9,636,984 B1 | 5/2017 | Baccouche et al. | |
| 10,005,349 B2 | 6/2018 | Baccouche et al. | |

FOREIGN PATENT DOCUMENTS

CN        109204465 A      1/2019

* cited by examiner

*Primary Examiner* — John D Walters
(74) *Attorney, Agent, or Firm* — David Kelley, Esq.; Carlson, Gaskey & Olds, P.C.

(57) ABSTRACT

A battery pack attachment assembly includes, among other things, a first bracket configured to be secured directly to a vehicle underbody, and a second bracket. The first bracket extends vertically above the first bracket such that the second bracket is spaced from the vehicle underbody when the first bracket is secured directly to the vehicle underbody.

18 Claims, 4 Drawing Sheets

BATTERY PACK TO VEHICLE ATTACHMENT ASSEMBLY AND ATTACHMENT METHOD

TECHNICAL FIELD

This disclosure relates generally to attaching a battery pack to an electrified vehicle and, more particularly, to attaching the battery pack utilizing a mounting bracket assembly.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively with an internal combustion engine. Electrified vehicles may use electric machines instead of, or in addition to, the internal combustion engine.

Example electrified vehicles include hybrid electric vehicles (HEVs), plug-in hybrid electric vehicles (PHEVs), fuel cell vehicles, and battery electric vehicles (BEVs). A powertrain for an electrified vehicle can include a high-voltage battery pack having battery cells that store electric power for powering the electric machines and other electrical loads of the electrified vehicle.

SUMMARY

A battery pack attachment assembly, according to an exemplary aspect of the present disclosure includes, among other things, a first bracket configured to be secured directly to a vehicle underbody, and a second bracket. The first bracket extends vertically above the second bracket such that the second bracket is spaced from the vehicle underbody when the first bracket is secured directly to the vehicle underbody.

A further exemplary embodiment of the foregoing battery pack attachment assembly includes a battery pack. The second bracket is forward a side rail of the battery pack relative to an orientation of a vehicle having the battery pack.

In a further exemplary embodiment of any of the foregoing battery assemblies includes a sub-frame. The second bracket is disposed horizontally between a sub-frame and the side rail such that a load applied to a front of the vehicle follows a load path that extends through the sub-frame, the second bracket, and the side rail.

In a further exemplary embodiment of any of the foregoing battery assemblies, the second bracket is secured directly to the side rail.

In a further exemplary embodiment of any of the foregoing battery assemblies, the first bracket and the second bracket are extruded brackets.

In a further exemplary embodiment of any of the foregoing battery assemblies, a direction of extrusion for the extruded brackets extends in a vertical direction.

In a further exemplary embodiment of any of the foregoing battery assemblies, the first bracket is telescopically received within the second bracket.

A further exemplary embodiment of any of the foregoing battery assemblies includes a mechanical fastener received within an aperture of the first bracket. The mechanical fastener secures the first bracket to the vehicle underbody.

A further exemplary embodiment of any of the foregoing battery assemblies includes a sleeve that is also received within the aperture. The mechanical fastener is disposed within the sleeve.

A further exemplary embodiment of any of the foregoing battery assemblies includes a collar of the sleeve. The collar is clamped between the first bracket and the vehicle underbody when the first bracket is secured directly to the vehicle underbody.

In further exemplary embodiment of any of the foregoing battery assemblies, the mechanical fastener is a first mechanical fastener. The assembly further includes a plurality of second mechanical fasteners that secure a side rail of the battery pack to the vehicle underbody. The plurality of second mechanical fasteners are laterally outside the first mechanical fastener.

A further exemplary embodiment of any of the foregoing battery assemblies includes at least one coolant line, at least one electrical wire, or both disposed vertically between the second bracket and the vehicle underbody.

A battery pack attachment method according to another exemplary aspect of the present disclosure includes securing a battery pack to a vehicle underbody using a first bracket that is received within a second bracket. The second bracket is spaced from the vehicle underbody when the first bracket is secured directly to the vehicle underbody. The first bracket is secured directly to the vehicle. The second bracket secured to the first bracket and the battery pack.

In a further non-limiting embodiment of the foregoing method, the second bracket is disposed horizontally between a sub-frame and a side rail of the battery pack such that a load applied to a front of the vehicle follows a load path that extends through the sub-frame, the second bracket, and the side rail.

In a further non-limiting embodiment of any the foregoing methods, the first bracket and the second bracket are extruded brackets.

In a further non-limiting embodiment of any of the foregoing methods, a direction of extrusion for the extruded brackets extends in a vertical direction.

A further non-limiting embodiment of any of the foregoing methods includes securing the first bracket to the vehicle underbody using a mechanical fastener that extends through an aperture in the first bracket.

In a further non-limiting embodiment of any of the foregoing methods, the mechanical fastener is a first mechanical fastener. The method further includes securing a side rail of the battery pack to the vehicle underbody using a plurality of second mechanical fasteners. The plurality of second mechanical fasteners are laterally outside the first mechanical fastener.

A further non-limiting embodiment of any of the foregoing methods includes positioning the mechanical fastener with a sleeve that is received within the aperture.

A further non-limiting embodiment of any of the foregoing methods includes routing a coolant line, an electrical wire, or both between the second bracket and the vehicle underbody.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

Although specific component relationships are illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

DETAILED DESCRIPTION

The disclosure details a mounting bracket used to secure a battery pack to an underbody of an electrified vehicle. The mounting bracket incorporates features that can help to direct loads around the battery pack when a load is applied to the vehicle, particularly a load applied to a front of the vehicle.

Figure 1:
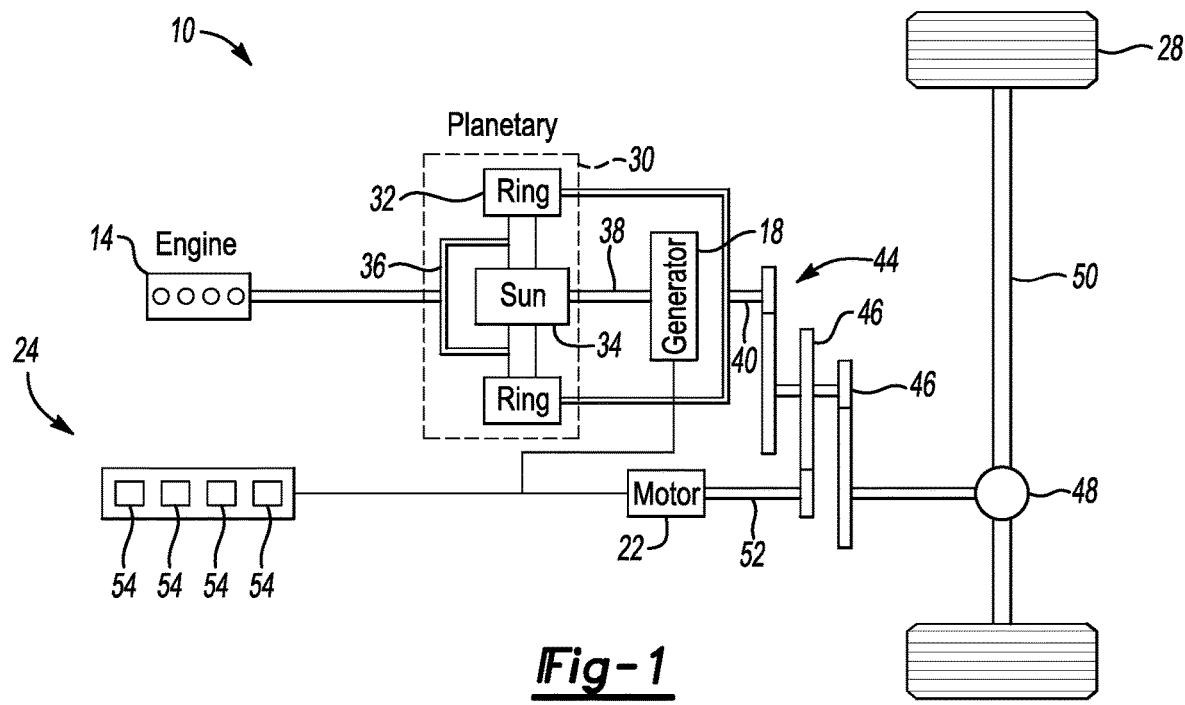
FIG. 1 schematically illustrates an exemplary powertrain of an electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and at least one battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

In the exemplary embodiment, the battery pack 24 is a high-voltage battery that is capable of outputting electrical power to operate the motor 22 and the generator 18. Other types of energy storage devices and/or output devices can also be used with the electrified vehicle having the powertrain 10. The battery pack 24 is a traction battery pack as the battery pack 24 can power to drive the vehicle drive wheels 28.

In the exemplary embodiment, the at least one battery pack 24 is a single battery pack including a plurality of battery arrays 54. Each of the battery arrays 54 includes a plurality of individual battery cells. Other powertrains could include more than one battery pack each having a separate enclosure.

Figure 2:
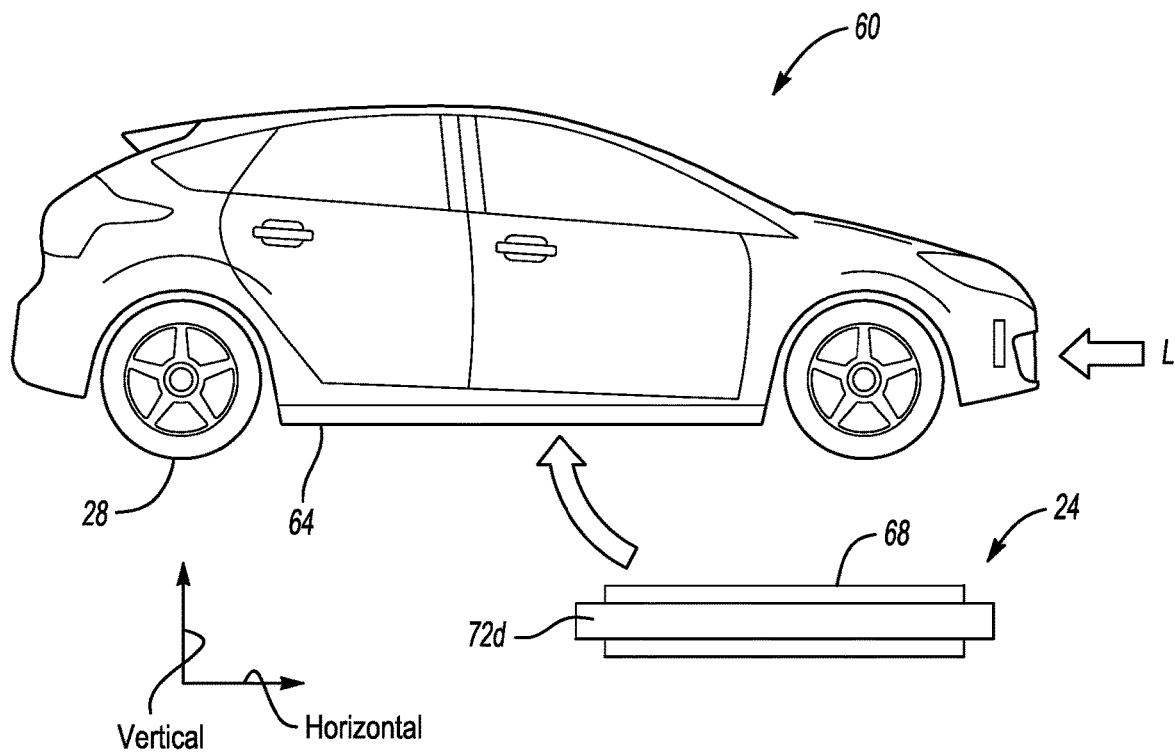
FIG. 2 illustrates a side view of an exemplary electrified vehicle that incorporates the powertrain of FIG. 1 and shows how a battery pack can be secured to a vehicle underbody of the electrified vehicle.

Referring to FIG. 2, an electrified vehicle 60 incorporating the powertrain 10 of FIG. 1 includes the battery pack 24 secured to an underbody 64 of the electrified vehicle 60.

Figure 3:
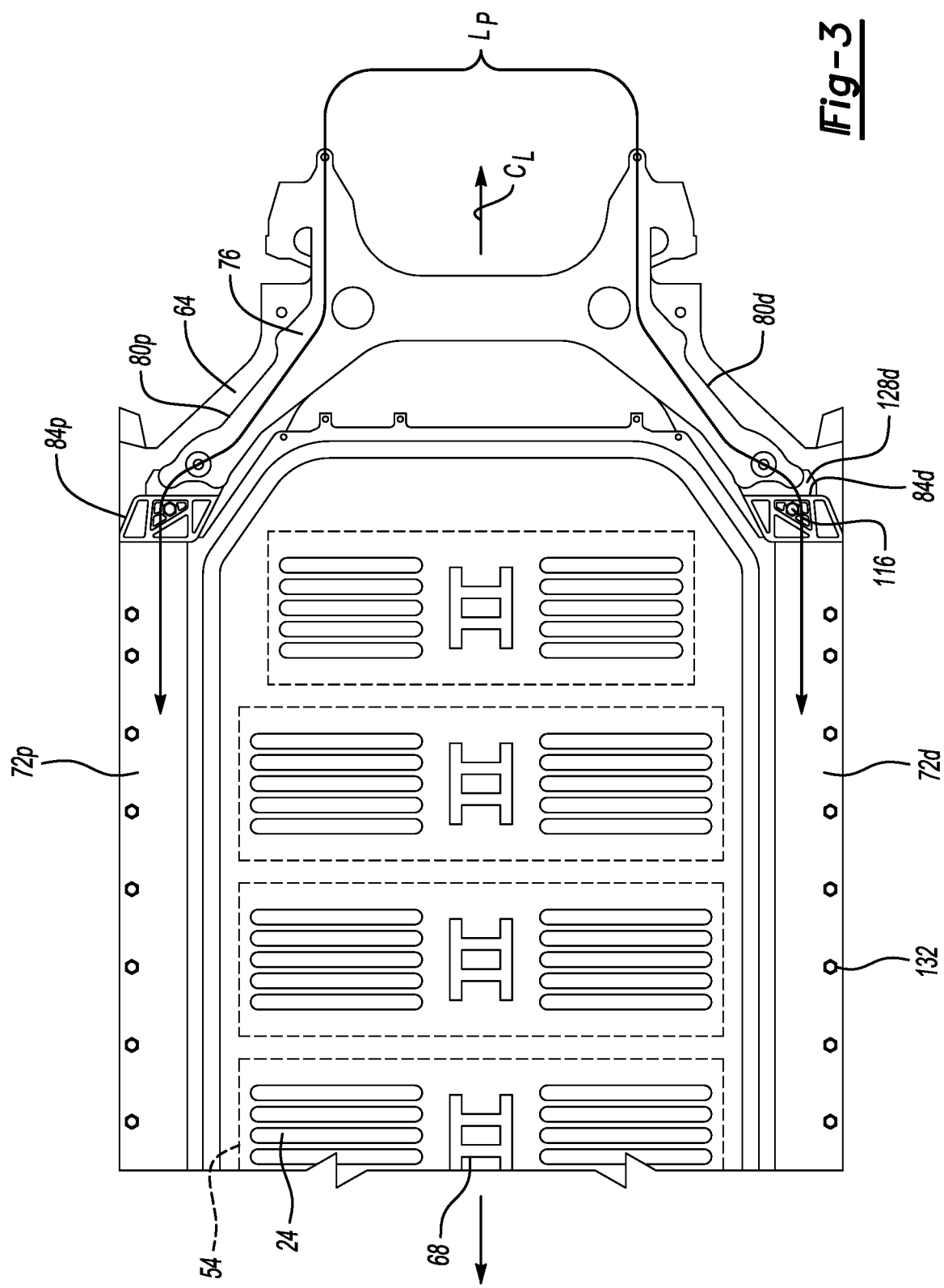
FIG. 3 illustrates a bottom view of selected portions of the exemplary electrified vehicle when the battery pack is secured to the vehicle underbody.

With reference to FIG. 3 and continued reference to FIG. 2, the battery pack 24 includes an enclosure 68 that houses the battery arrays 54, a passenger side rail 72p, and a driver side rail 72d. The enclosure 68 is disposed laterally between the passenger side rail 72p and the driver side rail 72d.

Forward of the battery pack 24 is a sub-frame 76 of the vehicle 60. Forward and aft, for purpose of this disclosure are with reference to the general orientation of the vehicle 60. The sub-frame 76 includes an arm 80p that extends rearward and laterally outward toward a passenger side of the vehicle 60, and an arm 80d that extends rearward and laterally outward toward a driver side of the vehicle 60.

A mounting bracket assembly 84p is disposed horizontally between the arm 80p of the sub-frame 76 and the side rail 72p of the battery pack 24. Another mounting bracket assembly 84d is disposed horizontally between the arm 80d of the sub-frame 76 and the side rail 72d of the battery pack 24.

When a load L (FIG. 2) is applied to a front of the vehicle 60, a resulting load path $L_P$ can extend through the sub-frame 76 and the arms 80p and 80d. The mounting bracket assemblies 84p, 84d facilitate transferring and redirecting the load path $L_P$ to the side rails 72p, 72d of the battery pack 24. This helps to route the load path $L_P$ about the enclosure 68 of the battery pack 24 containing the battery arrays 54. The side rails 72p, 72d may more suitably withstand an applied load from a front of the vehicle 60 than the battery arrays 54. The side rails 72p, 72d can be extrusions, and can have a direction of extrusion that is aligned with a longitudinal axis of the vehicle 60 when the battery pack 24 is installed within the vehicle 60.

Figure 4:
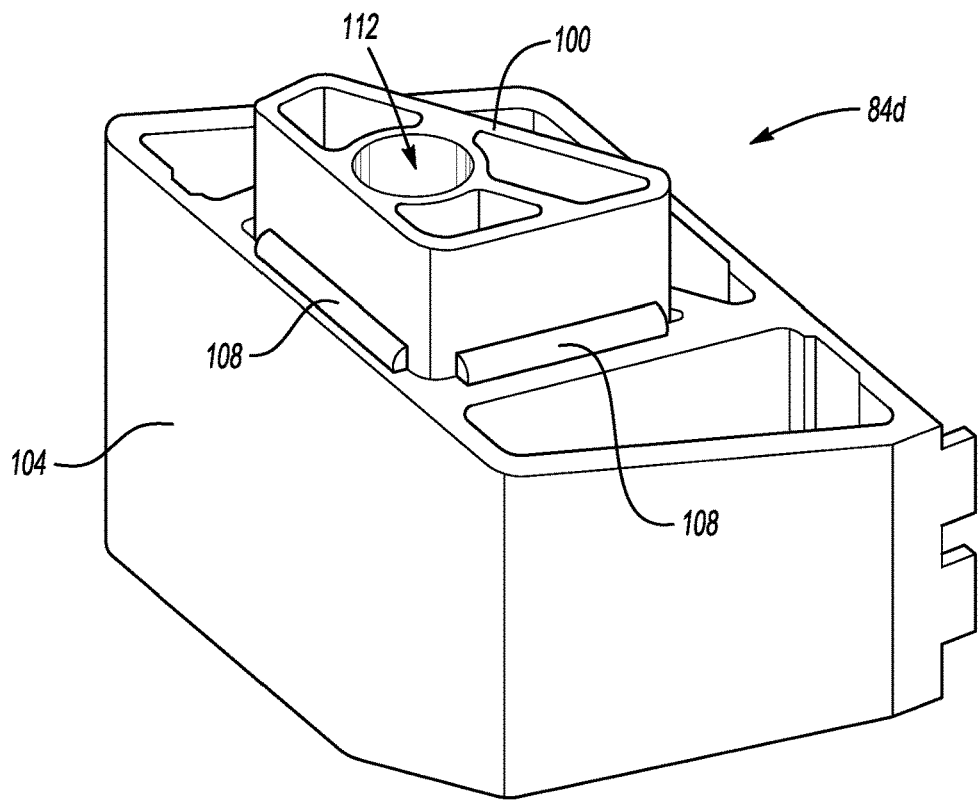
FIG. 4 illustrates a perspective view of a mounting bracket assembly used to secure the battery pack of FIG. 3 to the vehicle underbody.

With reference now to FIG. 4, the mounting bracket assembly 84d includes a first bracket 100 and a second bracket 104. In the exemplary embodiment, the first bracket 100 is received within the second bracket 104. The first bracket 100 can be secured to the second bracket 104 using welds 108, for example. The welds 108 may be Metal Inert Gas (MIG) welds. The first bracket 100 is secured such that the first bracket 100 projects vertically above the second bracket 104 when the mounting bracket assembly 84d is installed within the vehicle 60. Vertical and horizontal, for purposes of this disclosure are with reference to ground (FIG. 2).

Figure 5:
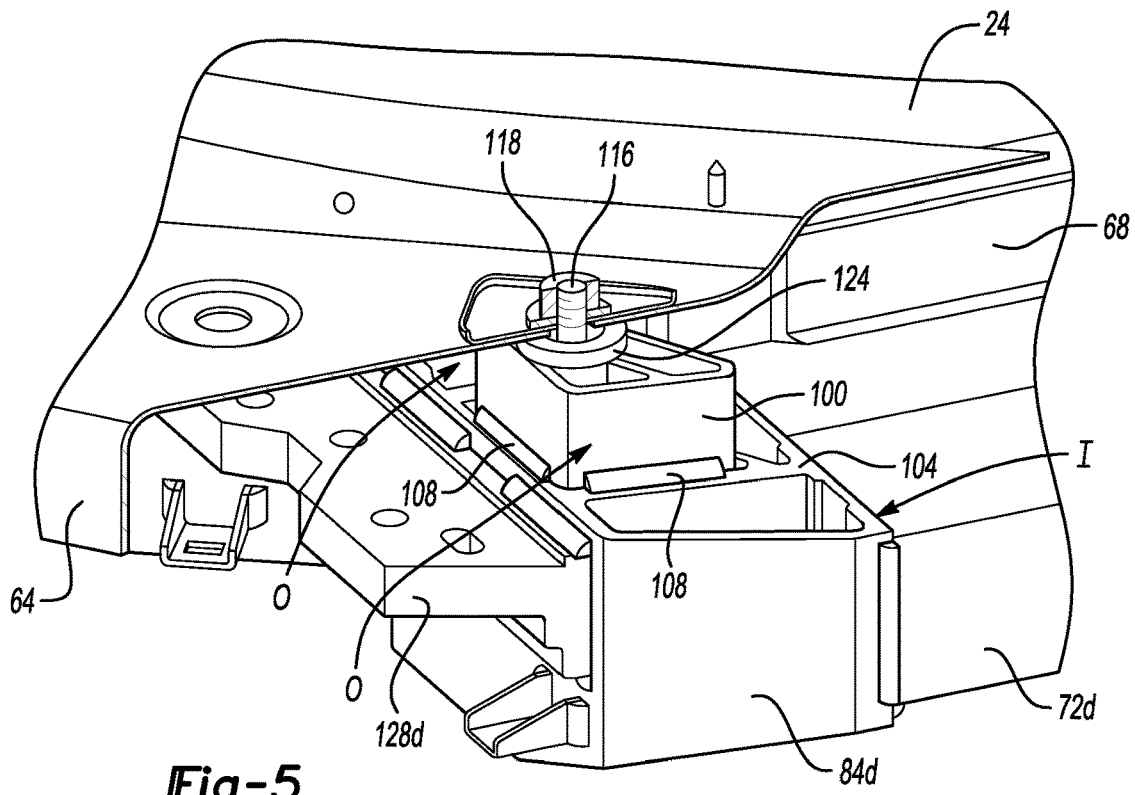
FIG. 5 illustrates a perspective view of the mounting bracket assembly of FIG. 4 when the mounting bracket assembly is securing the battery pack to the vehicle underbody, which is shown in a section view.
Figure 6:
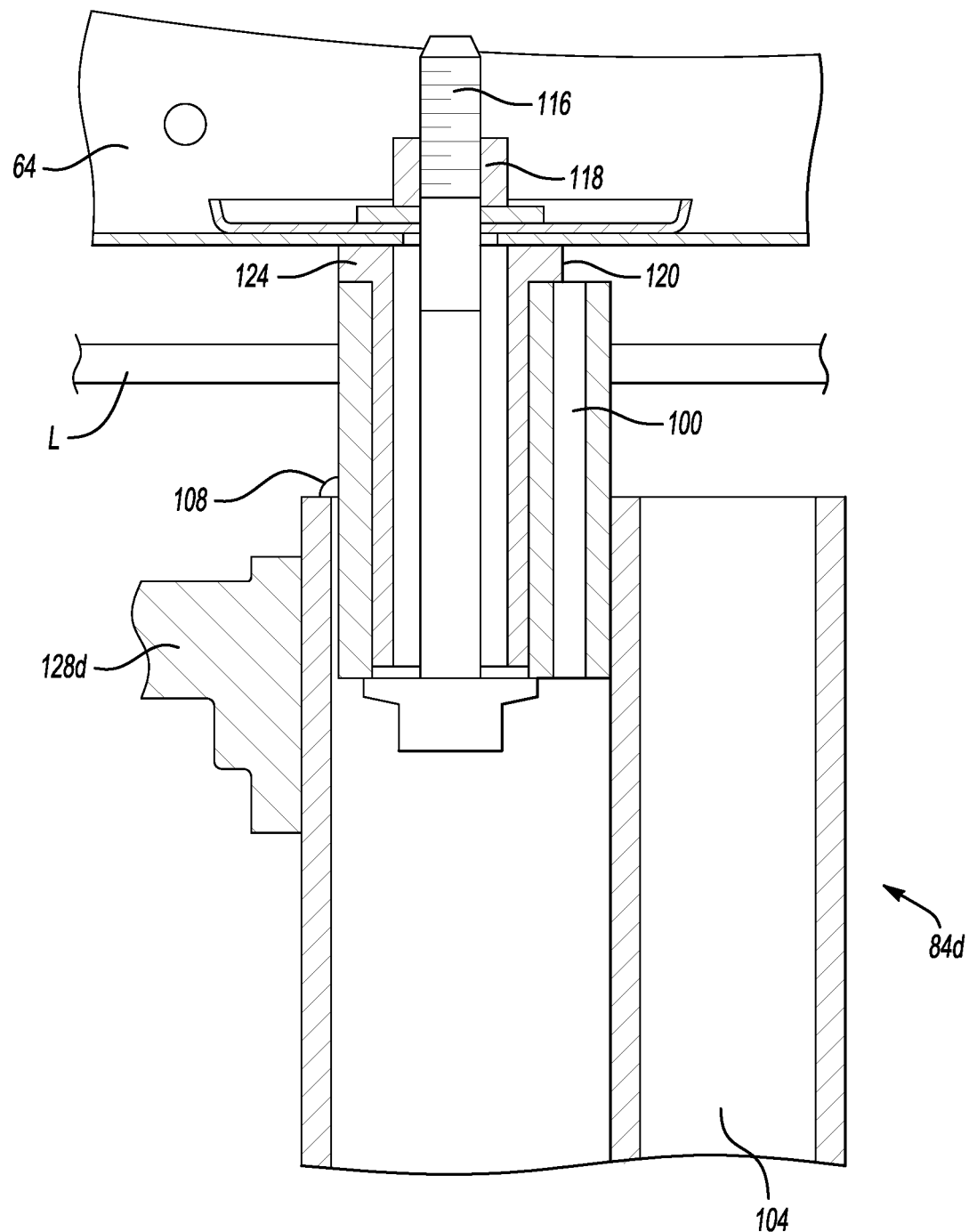
FIG. 6 illustrates a section side view of the mounting bracket assembly when securing the battery pack to the vehicle underbody.

With reference now to FIGS. 5 and 6 and continuing reference to FIG. 4, the first bracket 100 provides an aperture 112. When the mounting bracket assembly 84d is securing the battery pack 24 to the underbody 64, a mechanical fastener 116, here a bolt, extends through the aperture 112. The mechanical fastener 116 threadably engages a weld nut 118 on the underbody 64 to attach the mounting bracket assembly 84d to the underbody 64.

In the exemplary embodiment, a cylindrical sleeve 120 is also received within the aperture 112. The mechanical fastener 116 is positioned within the cylindrical sleeve 120 when securing the mounting bracket assembly 84d to the underbody 64. Torqueing down the mechanical fastener 116 clamps clamp a collar 124 of the cylindrical sleeve 120 vertically between the first bracket 100 and the underbody 64. The collar 124 extends radially outward from portions of the sleeve 120 received within the aperture 112. The cylindrical sleeve 120 can help to protect against corrosion of the mechanical fastener 116.

The mounting bracket assembly 84d, and particularly the second bracket 104, is secured to a forward surface of the side rail 72d at an interface I (FIG. 5). The second bracket 104 can be welded to the side rail 72d, for example. The welds may be Metal Inert Gas (MIG) welds. Since the mounting bracket assembly 84d is secured to the side rail 72d, securing the mounting bracket assembly 84d to the underbody 64 can help to secure the battery pack 24 to the underbody 64.

When secured, the second bracket 104 is spaced from the underbody 64. The second bracket 104 being spaced from the underbody 64 means, for purposes of this disclosure, that there is an open area O between a vertically upper surface of the second bracket 104 and the underbody 64. In this example, the spacing of the second bracket 104 from the underbody 64 provides an open area O vertically between the underbody 64 and the second bracket 104 on both sides of the first bracket 100.

The open areas O can be utilized to accommodate at least one coolant line, at least one electrical wire, or a hydraulic line, such as a brake line, or some combination of these. An example coolant line L is shown in FIG. 6.

Eliminating material of the second bracket 104 from the open area O can help to reduce weight and material costs as less material is required to provide the second bracket 104.

A forward facing surface of the mounting bracket assembly 84d is secured directly to a front sub-frame bracket 128d.

The mounting bracket assembly 84d could be secured to the front sub-frame bracket 128d via welding or another type of attachment. The front sub-frame bracket 128d is connected to the sub-frame 76, and specifically the arm 80d of the sub-frame 76, to connect the sub-frame 76 to the mounting bracket assembly 84d. When the load L is applied to the vehicle 60 (FIG. 2), the load path $L_P$ passes through the arm 80d, to the front sub-frame bracket 128d, to the mounting bracket assembly 84d, and to the side rail 72d.

Referring again to FIG. 3, the mechanical fastener 116 is positioned laterally a first distance from a center line $C_L$ of the vehicle. The side rail 72d is directly secured to the underbody 64 via a plurality of mechanical fasteners 132 positioned further laterally outward than the fastener 116. That is, the fasteners 132 are laterally outside the fastener 116. The connection of the mechanical fastener 116 to the underbody 64 at a position laterally inside the plurality of mechanical fasteners 132 can be required due to packaging requirements, for example.

As shown in FIG. 6, the first bracket 100 does not extend vertically downward as far as the second bracket 104. This, among other things, reduces a longitudinal length of the aperture 112, which can facilitate using the same sized fasteners as the fastener 116 and the fastener 132. The same sized fasteners can be used even through the head of the fastener 116 is vertically above the heads of the fasteners 132 when the battery pack 24 is installed. The mounting bracket assembly 84d can be adjusted to accommodate different vertical heights by telescoping the first bracket 100 and the second bracket 104 relative to each other a different amount prior to securing the first bracket 100 to the second bracket 104.

The first bracket 100 and the second bracket 104 are extruded brackets in this example. A person having skill in this art and the benefit of this disclosure would be able to structurally distinguish an extruded bracket from a bracket that is not an extruded bracket, such as a bracket that is cast. Although the exemplary first bracket 100 and second bracket 104 are extruded brackets, the first bracket 100 and the second bracket 104 could be cast brackets in another example, or some other type of brackets.

As can be appreciated, a direction of extrusion for the first bracket 100 and the second bracket 104 is vertical when the mounting bracket assembly 84d is secured to the underbody 64. That is, the direction of extrusion for both the first bracket 100 and the second bracket 104 is extending in a vertical direction. With reference again to FIG. 3, the mounting bracket assembly 84p is utilized to secure the battery pack 24 to the underbody 64 and to provide a portion of the load path $L_P$ that extends from the arm 80p to the passenger side rail 72p. The mounting bracket assembly 84p is symmetric to the mounting bracket assembly 84d relative to the centerline $C_L$.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:
1. A battery pack attachment assembly, comprising:
   a first bracket configured to be secured directly to a vehicle underbody; and
   a second bracket attached to the first bracket, the first bracket extending vertically above the second bracket such that the second bracket is spaced from the vehicle underbody when the first bracket is secured directly to the vehicle underbody; and at least one coolant line, at least one electrical wire, or both disposed vertically between the second bracket and the vehicle underbody.

2. The battery pack attachment assembly of claim 1, wherein the first bracket and the second bracket are extruded brackets.

3. The battery pack attachment assembly of claim 2, wherein a direction of extrusion for the extruded brackets extends in a vertical direction.

4. The battery pack attachment assembly of claim 1, wherein the first bracket is telescopically received within the second bracket.

5. The battery pack attachment assembly of claim 1, further comprising a mechanical fastener received within an aperture of the first bracket, the mechanical fastener securing the first bracket to the vehicle underbody.

6. The battery pack attachment assembly of claim 5, further comprising a sleeve that is also received within the aperture, the mechanical fastener disposed within the sleeve.

7. The battery pack attachment assembly of claim 6, further comprising a collar of the sleeve, the collar clamped between the first bracket and the vehicle underbody when the first bracket is secured directly to the vehicle underbody.

8. A battery pack attachment assembly, comprising:
a first bracket configured to be secured directly to a vehicle underbody; and
a second bracket attached to the first bracket, the first bracket extending vertically above the second bracket such that the second bracket is spaced from the vehicle underbody when the first bracket is secured directly to the vehicle underbody; and
a battery pack, wherein the second bracket is forward a side rail of the battery pack relative to an orientation of a vehicle having the battery pack.

9. The battery pack attachment assembly of claim 8, further comprising a sub-frame, wherein the second bracket is disposed horizontally between the sub-frame and the side rail such that a load applied to a front of the vehicle follows a load path that extends through the sub-frame, the second bracket, and the side rail.

10. The battery pack attachment assembly of claim 8, wherein the second bracket is secured directly to the side rail.

11. A battery pack attachment assembly, comprising:
a first bracket configured to be secured directly to a vehicle underbody; and
a second bracket attached to the first bracket, the first bracket extending vertically above the second bracket such that the second bracket is spaced from the vehicle underbody when the first bracket is secured directly to the vehicle underbody;
a mechanical fastener received within an aperture of the first bracket, the mechanical fastener securing the first bracket to the vehicle underbody,
wherein the mechanical fastener is a first mechanical fastener, and further comprising a plurality of second mechanical fasteners that secure a side rail of the battery pack to the vehicle underbody, the plurality of second mechanical fasteners laterally outside the first mechanical fastener.

12. A battery pack attachment method, comprising:
securing a battery pack to a vehicle underbody using a first bracket that is received within a second bracket, the second bracket is spaced from the vehicle underbody when the first bracket is secured directly to the vehicle underbody, the first bracket secured directly to the vehicle, the second bracket secured to the first bracket and the battery pack; and
routing a coolant line, an electrical wire, or both between the second bracket and the vehicle underbody.

13. The battery pack attachment method of claim 12, wherein the second bracket is disposed horizontally between a sub-frame and a side rail of the battery pack such that a load applied to a front of the vehicle follows a load path that extends through the sub-frame, the second bracket, and the side rail.

14. The battery pack attachment method of claim 12, wherein the first bracket and the second bracket are extruded brackets.

15. The battery pack attachment method of claim 14, wherein a direction of extrusion for the extruded brackets extends in a vertical direction.

16. The battery pack attachment method of claim 12, further comprising securing the first bracket to the vehicle underbody using a mechanical fastener that extends through an aperture in the first bracket.

17. The battery pack attachment method of claim 16, wherein the mechanical fastener is a first mechanical fastener, and further comprising securing a side rail of the battery pack to the vehicle underbody using a plurality of second mechanical fasteners, the plurality of second mechanical fasteners laterally outside the first mechanical fastener.

18. The battery pack attachment method of claim 16, further comprising positioning the mechanical fastener with a sleeve that is received within the aperture.

* * * * *